United States Patent [19]

Butterfield et al.

[11] Patent Number: 4,527,745

[45] Date of Patent: Jul. 9, 1985

[54] QUICK DISCONNECT FLUID TRANSFER SYSTEM

[75] Inventors: Ted Butterfield, Naperville; George E. Bird, Hickory Hills; Gary A. Paulsen, Geneva; Edward J. O'Brien, Barrington, all of Ill.

[73] Assignee: Spraying Systems Co., Wheaton, Ill.

[21] Appl. No.: 496,968

[22] Filed: May 23, 1983

Related U.S. Application Data

[63] Continuation-in-part of Ser. No. 382,912, May 28, 1982, abandoned.

[51] Int. Cl.$^3$ .................... B05B 1/00; F16L 21/02
[52] U.S. Cl. .................... 239/600; 239/590.3; 285/197; 285/376; 285/402
[58] Field of Search ............ 220/327; 277/168, 169, 277/207; 285/158, 197, 376, 401, 402; 239/590.3, 600

[56] References Cited

U.S. PATENT DOCUMENTS

| 2,252,132 | 8/1941 | Mazveskas et al. | 285/402 |
| 2,618,511 | 11/1952 | Wahlin | 285/198 |
| 2,672,187 | 3/1954 | Smith | 239/600 |
| 3,705,693 | 12/1972 | Franz | 239/600 |
| 3,799,453 | 3/1974 | Hart | 239/600 |
| 4,185,781 | 1/1980 | O'Brien | 239/600 |
| 4,438,884 | 3/1984 | O'Brien et al. | 239/600 |

OTHER PUBLICATIONS

Lumark Ltd. Engineers publication on "EEZIFIT Series High Pressure Colour Coded Cap-Tip Nozzles".
Applicant's copending application Ser. No. 317,199, filed Nov. 2, 1981.

Primary Examiner—Andres Kashnikow
Assistant Examiner—James R. Moon, Jr.

Attorney, Agent, or Firm—Leydig, Voit, Osann, Mayer & Holt, Ltd.

[57] ABSTRACT

A fluid transfer system including a cap member having a first fluid transfer member therein and being removably mountable on a second fluid transfer member. Cooperating lugs and slots formed by the cap member and second member lock the two members together when the cap is placed on the second member and rotated relative thereto. A resilient annular gasket is disposed between the second member and cap member and surrounds the liquid passageway therethrough to prevent leakage. The second member and cap members form an annular space on one side of the outer peripheral portion of the gasket, and an annular bead presses against the other side of the outer peripheral portion of the gasket so that the bead bends that portion of the gasket into the annular space to effect a liquid-tight seal on both sides of the gasket. In the preferred embodiment, the locking lugs are formed on the second member which fits inside the cap member, and the locking slots formed by the cap member extend radially through the wall of the cap member so that the cooperating lugs on the body member are visible through the slots. The slots form cam surfaces which force the cap member tightly onto the second member, and locking notches adjacent the ends of the cam surfaces for holding the cap member in a predetermined locked position. The ends of the notches adjacent the cam surfaces are tapered in the direction of the cam surfaces so that the application of a turning torque to the cap is sufficient to disengage the locking notches from the lugs, thereby facilitating disassembly of the cap. In one embodiment, the fluid transfer system comprises a spray nozzle assembly in which the first fluid transfer member is a spray tip seated in the cap, and in alternate embodiments, pipe coupling assemblies are disclosed wherein the first and second fluid transfer members are pipe sections.

31 Claims, 12 Drawing Figures

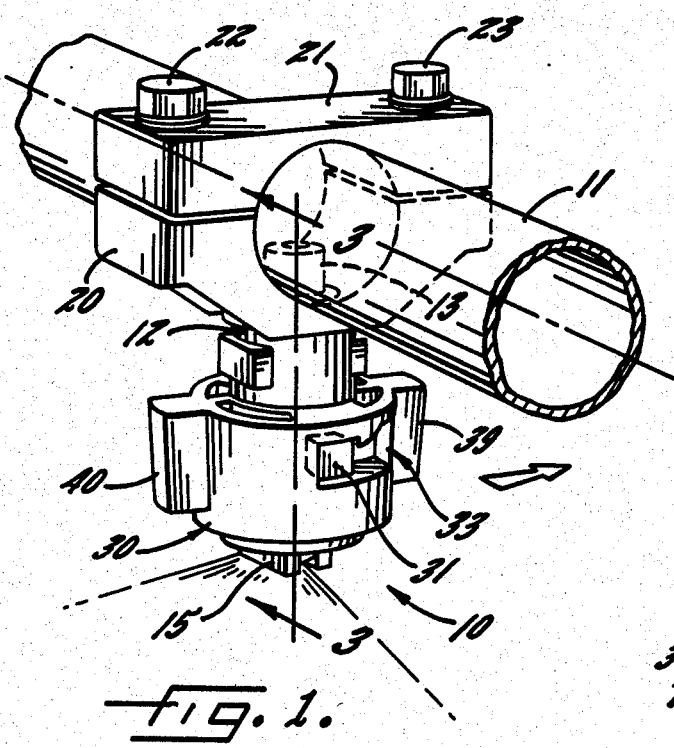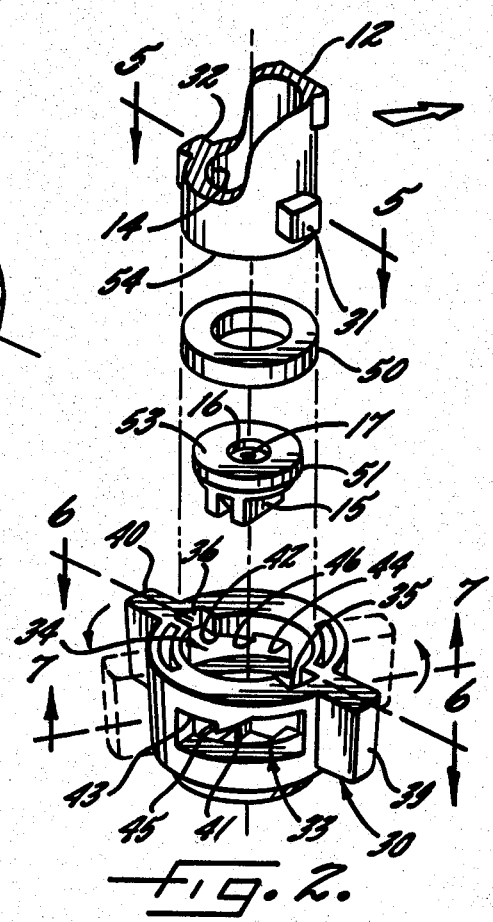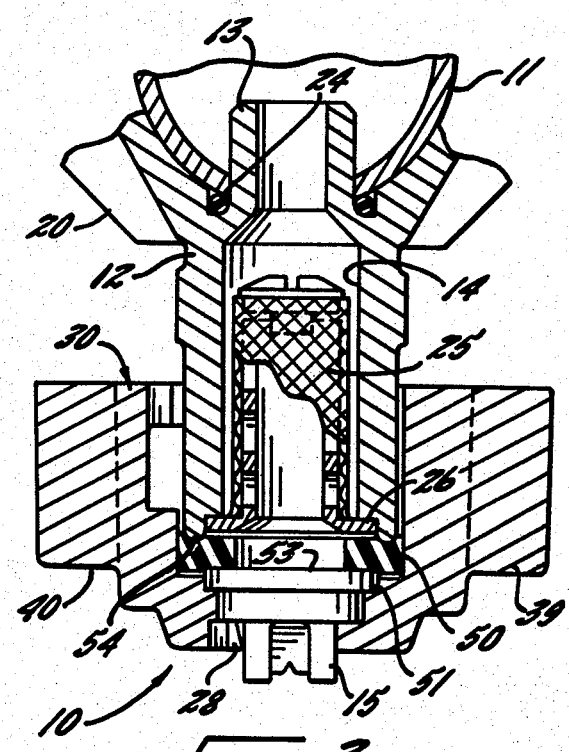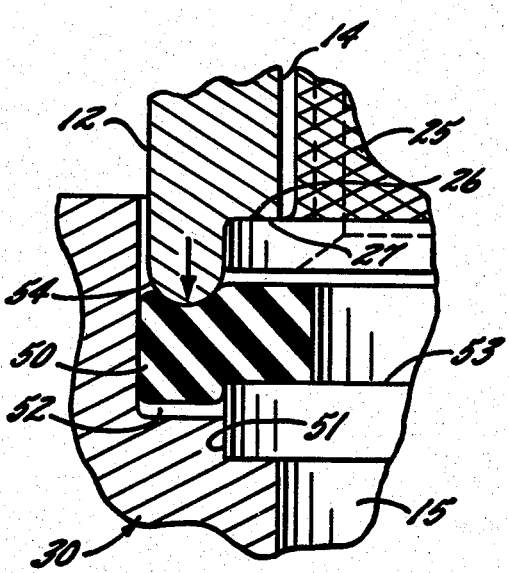

QUICK DISCONNECT FLUID TRANSFER SYSTEM

RELATED APPLICATION

This application is a continuation-in-part of applicant's copending U.S. patent application Ser. No. 382,912 filed May 28, 1982 and entitled "Spray Nozzle Assembly", now abandoned.

DESCRIPTION OF THE INVENTION

The present invention relates generally to fluid transfer systems, and more particularly, to spray nozzles and piping assemblies which are susceptible to quick assembly and disassembly.

Spray nozzles, for example, are used in a multitude of industrial, agricultural, and commercial applications in which it is frequently necessary to remove the spray tip for various reasons, such as inspection and cleaning, replacement of a worn spray tip, or substitution of spray tips to change the spray pattern. It is desirable, therefore, that such nozzle assemblies permit quick and easy tip removal, while ensuring precise tip orientation and sealing characteristics upon replacement. Many "quick-disconnect" nozzles have been previously proposed and manufactured, but in general those nozzles have had sealing problems and/or have made replacement of the spray tips relatively difficult or tiresome.

It is equally desirable to be able to quickly assemble and disassemble piping connections in spraying systems, as well as numerous other industrial, agricultural, and commercial applications. For example, while it is frequently advantageous to set up temporary piping layouts, heretofore this generally has not been possible without skilled plumbing help and special tools, which is relatively expensive. Although various quick disconnect couplings have been prepared for pipe connections, they similarly have had sealing problems and/or have been difficult or cumbersome to use.

It is an object of the present invention to provide a fluid transfer system with means which enable quick and easy coupling and uncoupling of fluid transfer members by hand without special tools, while providing reliable sealing qualities.

Another object of the present invention is to provide an improved spray nozzle assembly which makes removal and replacement of the spray tip extremely easy and quick, while at the same time ensuring an excellent seal to prevent the liquid being sprayed from leaking through the joints of the nozzle assembly.

A further object of this invention is to provide an improved spray nozzle assembly which permits the spray tip to be installed and removed solely by the application of a twisting torque to the cap of the assembly, without the necessity of simultaneously applying an axial pressure to the cap.

It is still another object of this invention to provide an improved spray nozzle assembly which automatically ensures accurate positioning of the spray tip. In this connection, a related object of the invention is to provide such an improved spray nozzle assembly which maintains precise orientation of the spray tip even when used in applications which subject the nozzle assembly to severe vibrations.

A further object of the present invention is to provide such an improved spray nozzle assembly which can be efficiently and economically manufactured at high production rates.

Still a further object of this invention is to provide an improved spray nozzle assembly of the foregoing type which can be used with a wide variety of different but interchangeable spray tips.

Yet another object of this invention is to provide an improved spray nozzle assembly of the type described above which permits the installer to see, feel and hear when the spray tip is properly installed.

Another object of the invention is to provide an improved spray nozzle assembly which ensures that removable spray tips will be held securely in the nozzle assembly without requiring extremely close manufacturing tolerances.

Still a further object of the invention is to provide a pipe coupling assembly for quickly and easily connecting pipe sections with a reliable liquid tight seal therebetween, while permitting easy disassembly by simple manual twisting of a coupling cap.

Other objects and advantages of the invention will be apparent from the following detailed description and the accompanying drawings, in which:

FIG. 1 is a perspective view of a spray nozzle assembly embodying the present invention, mounted on a pipe;

FIG. 2 is an exploded perspective view of the lower portion of the spray nozzle assembly shown in FIG. 1, with the cap turned to its unlocked position (the locked position of FIG. 1 being shown in broken lines);

FIG. 3 is an enlarged vertical section taken generally along line 3—3 in FIG. 1;

FIG. 4 is a further enlargement of a fragment of the vertical section shown in FIG. 3;

Figure 5:
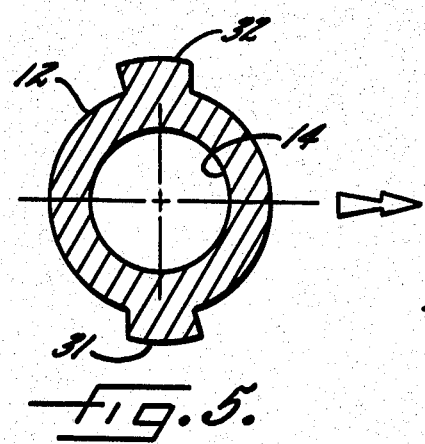
FIG. 5 is a horizontal section taken generally along the line 5—5 in FIG. 2.

While the invention has been shown and will be described in some detail with reference to specific exemplary embodiments of the invention, there is no intention that the invention be limited to such detail. On the contrary, it is intended to cover all modifications, alternatives and equivalents which may fall within the spirit and scope of the invention as defined in the appended claims.

Turning now more particularly to FIGS. 1–10 of the drawings, one embodiment of quick disconnect fluid transfer system in accordance with the invention is shown, which is a spray nozzle assembly 10 supplied with water or other liquid from a pipe 11. The nozzle assembly 10 includes a main body member 12 forming a nipple 13 which extends into the pipe 11 through a hole in the wall of the pipe. Pressurized liquid within the pipe 11 enters the nipple 13 and passes downwardly through a central fluid passageway 14 in the body member 12 for discharge through a spray tip 15. A wide variety of different spray tips can be used in the illustrative nozzle assembly, for producing an equally wide variety of different spray patterns.

For the purpose of securely mounting the spray nozzle assembly 10 on the pipe 11, the top of the body member 12 forms a first clamping element 20 which fits around one half of the pipe 11 and cooperates with a second clamping element 21 which fits around the other half of the pipe. The two clamping elements 20 and 21 are drawn toward each other, and into tight engagement with the pipe 11, by a pair of screws 22 and 23 which pass downwardly through the upper clamping element 21 and are threaded into the lower clamping element 20. As this clamp is tightened, it also presses the outside wall of the pipe 11 into firm sealing engagement with an O-ring 24 (FIG. 3) surrounding the base of the nipple 13, thereby forming a seal around the hole that is formed through the pipe wall to receive the nipple 13.

As can be seen most clearly in FIG. 3, the lower portion of the central fluid passageway 14 formed by the main body member 12 is enlarged to receive a strainer 25 for collecting any contaminants which might block the aperture of the spray tip 15 if allowed to enter the same. The lower end of the strainer 25 forms a radial flange 26 which seats in a complementary groove 27 formed by the lower end of the body member 12. The liquid that passes through the strainer 25 flows into and through the spray tip 15, which is seated in a cap 30 telescoped over the lower end of the body member 12. As can be seen in FIG. 2, the inner end of the spray tip 15 has a central recess 16 and bore 17 forming a fluid passageway leading into and through the tip, and the lower end of the tip is shaped to form the desired spray pattern as the liquid exits from the bore 17.

As one specific feature of the invention, the lower end of the cap 30 includes a pair of spring fingers 28 and 29 along one wall of the aperture that receives the spray tip 15. These spring fingers are formed as integral parts of the cap 30, with the tips of the fingers being tapered slightly inwardly in the longitudinal direction proceeding toward the end of the cap. When the spray tip 15 is inserted into the cap 30, it presses the spring fingers slightly outwardly in the radial direction, thereby producing an inward biasing force against the tip 15 to hold it in place. This arrangement provides a snug fit between the cap 30 and the spray tip 15 even though the dimensions of the tip and the cap vary somewhat due to manufacturing tolerances. Moreover, the spring fingers 28 and 29 automatically compensate for wearing of the surfaces of the cap aperture as different spray tips are inserted therein and removed therefrom.

Figure 6:
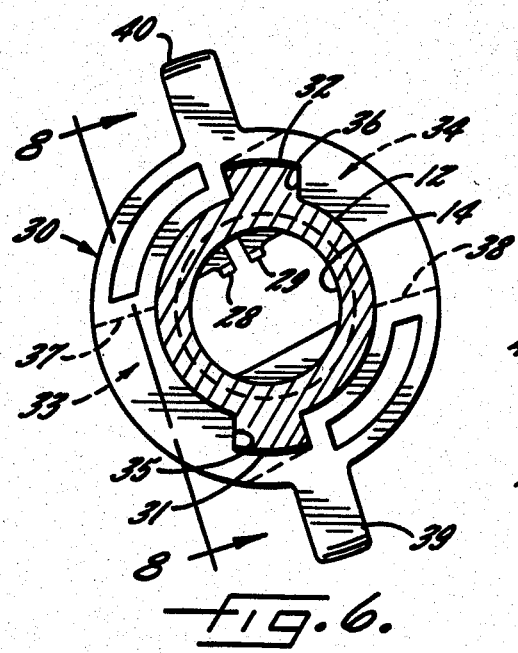
FIG. 6 is horizontal section taken generally along the line 6—6 in FIG. 2, with the end of the body member inserted in the cap.

In order to lock the cap 30 and the spray tip 15 in a precisely predetermined position on the lower end of the body member 12, a pair of lugs 31 and 32 on the body member 12 cooperate with a pair of positioning and locking slots 33 and 34 in the cap. This precise positioning of the cap 30 is important because it sets the position of the spray tip 15 and, therefore, the direction of the spray pattern. The locking action of the lugs 31 and 32 in the respective slots 33 and 34 is illustrated most clearly in FIGS. 6-9. When the cap 30 is first applied to the body member 12, the cap is positioned to register the two lugs 31 and 32 with a pair of access grooves 35 and 36 which have approximately the same cross-section configuration as the lugs 31 and 32. These access grooves permit the lugs 31 and 32 to enter the respective slots 33 and 34 when the cap is telescoped over the end of the body member 12, as illustrated in FIGS. 6 and 8.

Figure 7:
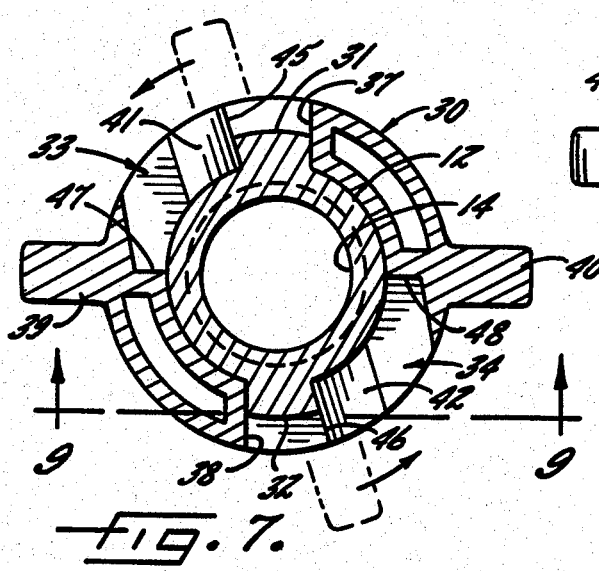
FIG. 7 is a horizontal section taken generally along line 7—7 in FIG. 2, with the end of the body member again inserted in the cap and with the cap turned to its locked position.
Figure 10:
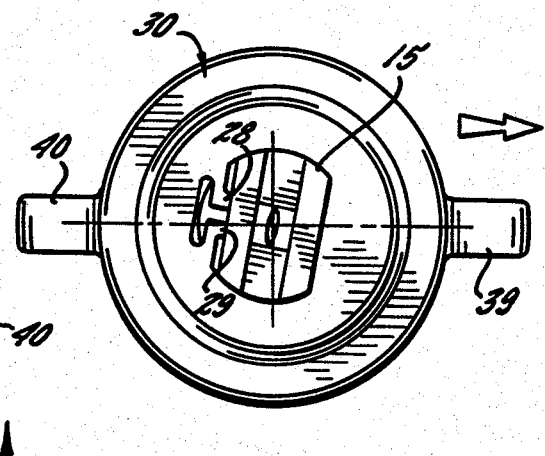
FIG. 10 is a bottom plan view of the nozzle assembly taken generally along line 10—10 in FIG. 9.

After the cap 30 has been telescoped over the body member 12 far enough to move the lugs 31 and 32 into the respective slots 33 and 34, the cap 30 is turned in a counterclockwise direction, as viewed in FIG. 7, until the end walls 37 and 38 of the respective slots butt against the lugs 31 and 32. To facilitate the turning of the cap 30, a pair of diametrically opposed ears 39 and 40 are formed as integral parts of the cap. During the turning movement of the cap 30, the cap 30 is cammed inwardly toward the end of the body member 12 by a pair of ramps 41 and 42 formed by the top walls of the slots 33 and 34 which ride on the tops of the lugs 31 and 32. These ramps 41 and 42 clear the lugs 31 and 32 just before the slot end walls 37 and 38 come into engagement with the lugs 31 and 32 to terminate the rotational movement of the cap 30. In this final position of the cap 30, the lugs 31 and 32 are registered with respective locking notches 43 and 44 formed by the top walls of the slots 33 and 34, between the ramps 41, 42 and the end walls 37, 38.

As will be described in more detail below, a biasing force urging the cap 30 away from the body member 12 tends to hold the notches 43 and 44 in firm engagement with the lugs 31 and 32. In addition, rotational movement of the cap 30 is restrained by a pair of shoulders 45 and 46 formed by the end walls of the notches 43 and 44 adjacent the ramps 41 and 42, respectively. As can be seen most clearly in FIG. 7, both the shoulders 45, 46 and the adjacent surfaces of the lugs 31 and 32 lie on radii of the cap 30 and the body member 12; consequently, the two pairs of opposed locking surfaces 43, 45 and 44, 46 engage each other continuously along the full radial width of the lugs 31 and 32. Thus, the cap 30 is securely locked against rotational movement in the return (clockwise) direction until a releasing torque is applied to the cap.

Figure 8:
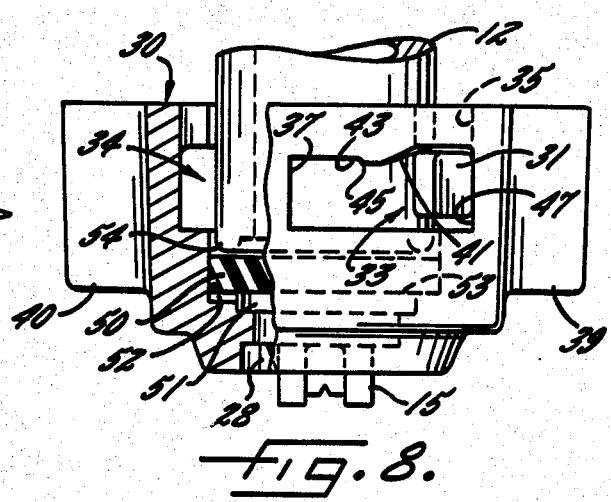
FIG. 8 is a partial side elevation and partial vertical section taken generally along the line 8—8 in FIG. 6.
Figure 9:
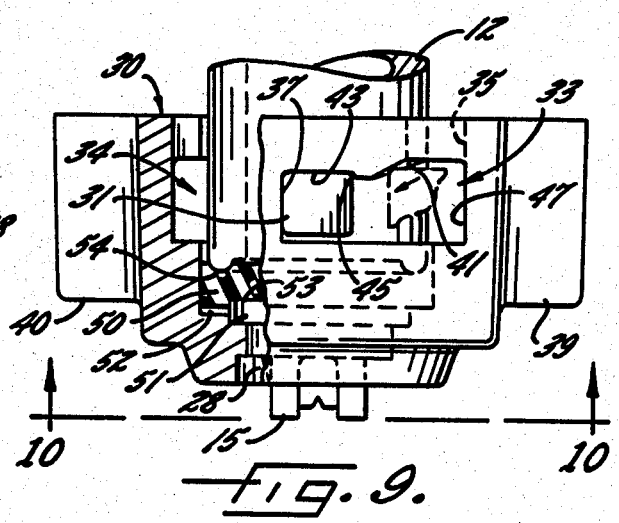
FIG. 9 is a partial side elevation and partial vertical section taken generally along line 9—9 in FIG. 7.

As can be seen most clearly in FIGS. 8 and 9, the shoulders 45 and 46 are tapered at an angle of 45° from the top surfaces of the lugs so that the shoulders effectively hold the cap 30 in its locked position when the nozzle assembly is subjected to the vibrations and jolts encountered in use, and yet an installer can easily apply enough manual torque to the cap to cause the shoulders 45 and 46 to ride up over the lugs 31, 32 for removal of the cap. With this design, it has been found that it is not necessary for the installer to push against the cap in the axial direction while the cap is being turned to unlock it; the twisting force alone is sufficient to disengage the notches 43, 44 from the lugs 31, 32, thereby greatly facilitating removal of the cap. This is a highly advantageous feature in field conditions where an installer might have to remove large numbers of such caps in order to change the spray tips in large spraying equipment.

As will be appreciated from the foregoing description, the illustrative structure permits the installer to both feel and hear when the cap has been turned to its locked position. The installer feels and hears the click of the detent action when the ramps 41, 42 clear the lugs 31, 32, bringing the locking notches 43, 44 into register with the lugs, and at about the same time the installer feels the slot end walls 37, 38 butting against the lugs. These tactile and audible features of the locking system facilitate installation of the cap 30 and the spray tip 15 seated therein.

Similarly, when the cap is being removed, the installer can feel when he has applied enough torque to the cap to force the shoulders 45, 46 over the lugs 31, 32. The cap is turned until the installer feels the slot end walls 47 and 48 butt against the respective lugs, at which point he knows that the lugs are aligned with the access grooves 35 and 36 so that the cap can be pulled off the nozzle assembly. Thus, the locking system includes tactile features which facilitate removal, as well as installation, of the cap.

In keeping with the present invention, the slots 33 and 34 which form the locking surfaces extend entirely through the walls of the cap 30 so that the positions of the locking lugs 31 and 32 are visible to the installer while the cap is being turned to the locked position. This permits the installer to see as well as feel and hear the locking action. More importantly, the installer can see the lugs 31 and 32 when he is applying the cap 30 and trying to align the access grooves 35 and 36 in the cap with the lugs 31 and 32 on the body member 12, as can be appreciated from FIG. 8. In this connection, it should be noted that the axial length of the lugs 31, 32 is substantially greater than the length of the access grooves 35, 36, as a result of which the lugs are never concealed within the grooves; i.e., the lugs are always visible above and/or below the ends of the access grooves 35, 36.

To facilitate the molding of the cap 30, which is typically made by injection molding a polymeric material, the slot end walls 37, 38 and 47, 48 are slightly tapered inwardly toward each other, as can be seen in FIG. 7. This permits the slots 33 and 34 to be formed by a pair of mold inserts which can be easily withdrawn from the molded cap after the polymeric material has solidified.

The locking action described above is enhanced by the spring force of a resilient annular gasket 50 which is disposed between the body member 12 and the cap 30. The primary function of this gasket 50 is to form a seal between the spray tip 15 and the body member 12, and the gasket 50 is slightly compressed in order to effect the desired seals in the final assembly. Because the gasket 50 is made of a resilient material, such as buna-N rubber for example, when it is compressed it exerts a biasing force which urges the spray tip 15 and the cap 30 away from the body member 12, thereby urging the locking notches 43 and 44 firmly against the lugs 31 and 32 (see FIG. 9). However, even with this biasing force on the cap, manual twisting of the cap (without any axial pressure) is sufficient to disengage the cap from the locking lugs.

In accordance with an important aspect of the present invention, the resilient annular gasket surrounds the entrance to the spray tip, and the body and cap members form (1) an annular space on one side of the outer peripheral portion of the gasket, and (2) an annular bead pressing against the opposite side of that portion of the gasket so that the bead bends the outer portion of the gasket into the annular space to effect a liquid-tight seal on both sides of the gasket. Thus, in the illustrative embodiment of the invention, and as shown most clearly in FIGS. 3 and 4, the gasket 50 extends radially outwardly beyond the outer periphery 51 of the spray tip 15. The radially outer portion of this gasket 50 extends over an annular space 52 which is formed by the cap 30, i.e., the portion of the cap immediately adjacent the periphery of the inner end 53 of the spray tip 15 is recessed below the surface of the end 53. On the opposite side of the gasket 50 from the annular space 52, an annular bead 54, formed as an integral part of the end of the body member 12, engages the outer peripheral portion of the gasket and bends it in an axial direction along the side walls of the spray tip 14 and into the annular space 52. This bending of the gasket 50 by the annular bead 54 creates an extremely tight liquid seal on both sides of the gasket. More specifically, on the side engaged by the bead 54 the sealing pressure is concentrated in the relatively small area engaged by the tip of the bead 54, rather than being distributed over the entire surface area on that side of the gasket. Similarly, the sealing pressure on the spray tip side of the gasket tends to be concentrated around the periphery of the inner end 53 of the spray tip.

In addition to forming an extremely effective liquid seal, the sealing arrangement of this invention also contributes to the facile installation and removal of the cap 30 containing the spray tip 15. During both the locking and the unlocking movement of the cap 30, it is necessary for the gasket 50 to slide over one or both of the two surfaces between which it is compressed. As can be clearly seen in FIG. 4, the rounded end on the annular bead 54 provides a smooth surface over which the gasket 50 can easily slide during rotational movement of the cap 30, as a result of which there is very little frictional resistance to the turning movement of the cap.

As can be seen from the foregoing detailed description, the spray nozzle assembly enables quiet and easy removal and replacement of the spray tip, while at the same time ensuring an excellent seal to prevent the liquid being sprayed from leaking through the joints of the nozzle assembly. This improved spray nozzle assembly permits the spray tip to be installed and removed solely by the application of a twisting torque to the cap of the assembly, without the necessity of simultaneously applying an axial pressure to the cap. Accurate positioning of the spray tip is automatically ensured, and the desired orientation of the spray tip is precisely maintained even when the nozzle assembly is used in applications which subject it to severe vibrations. Moreover, this nozzle assembly can be efficiently and economically manufactured at high production rates, and can be used with a wide variety of different but interchangeable spray tips. The locking system which locks the cap to the main body of the nozzle assembly permits the installer to see, feel and hear when the spray tip is properly installed, thereby further facilitating installation and removal of the cap and the spray tip.

Figures 11, 12:
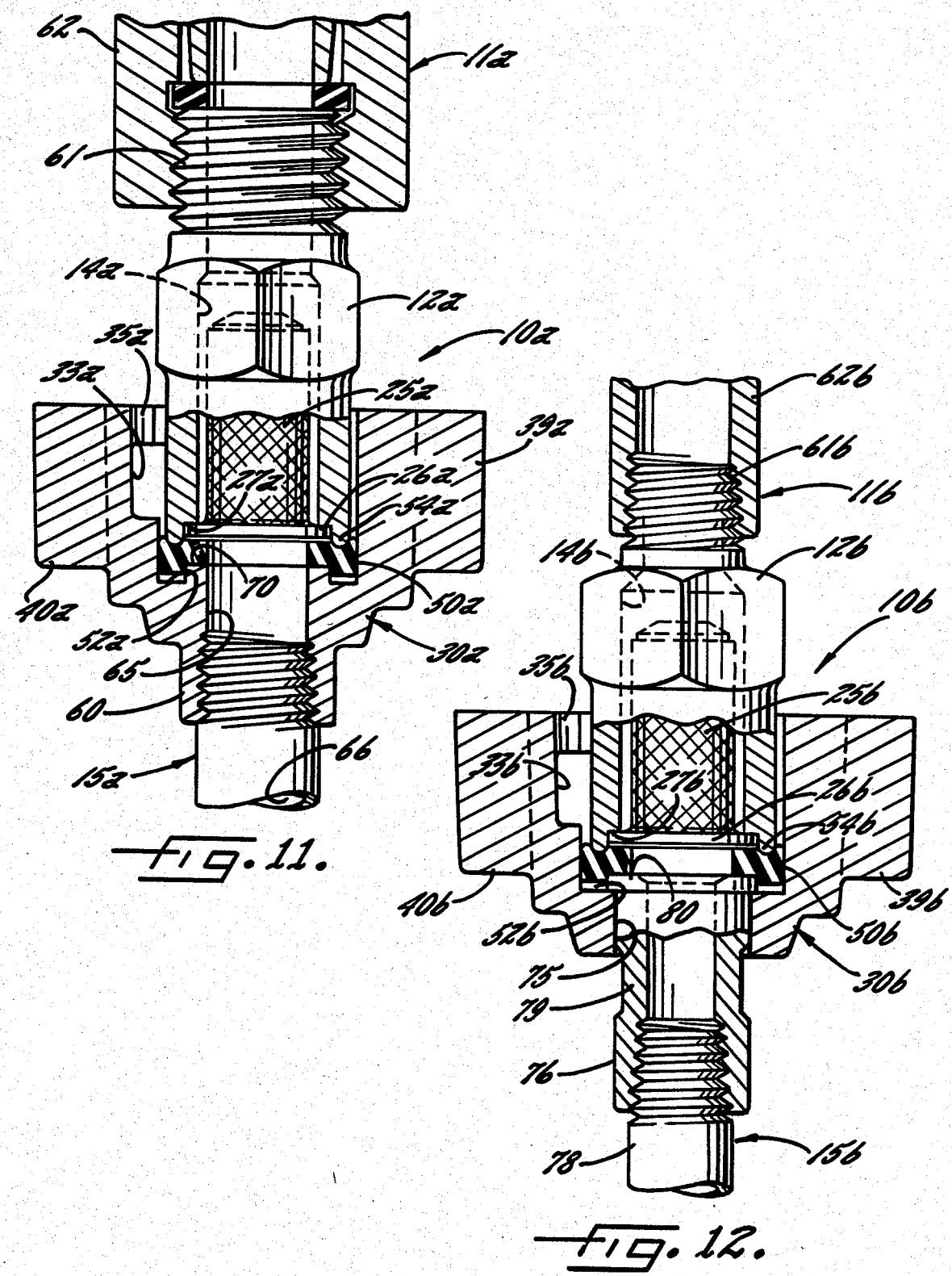
FIG. 11 is a section of an alternative embodiment of the invention, showing one form of quick disconnect pipe coupling assembly.
FIG. 12 is a section of an alternative form of pipe coupling assembly embodying the invention.

Referring now to FIG. 11, there is shown an alternative embodiment of quick disconnect fluid tranfer system, in the form of a pipe coupling assembly 10a, wherein parts similar to those described previously have been given similar reference numerals with the distinguished suffix "a" added. The pipe coupling assembly 10a includes a cap member 30a which carries in coaxial relation the end of a first fluid transfer member or pipe section 15a and which is removably mountable on the end of a second fluid transfer member or pipe section 11a. The cap member 30a in this instance has an internally threaded axial extension 60 to which an externally threaded end of the first pipe section 15a is engaged. The second fluid transfer member or pipe section 11a includes a body member or fitting 12a having an externally threaded end 61 to which a conduit 62 is affixed. The pipe section body member 12a has a fluid passageway 14a in communication with a passageway 65 in the cap member 30a, which in turn communicates with a passageway 66 in the pipe section 15a. The lowermost portion of the passageway 14a formed by the body member 12a is enlarged to receive a strainer 25a for collecting contaminants in a passing stream. The lower end of the strainer 25a forms a radial flange 26a which seats in the complimentary groove 27a formed by the lower end of the body member 12a. It will be appreciated that in this embodiment, fluid may be directed in either direction through the passageways 14a, 65, 66, and the use of the strainer 25a could be optional.

For locking the cap 30a and first fluid transfer member 15a on the lower end of the body member 12a, the body member 12a is provided with lugs (not shown in FIG. 11) identical to lugs 31 and 32 for the spray assembly body member 12 described previously, which cooperate with access and locking slots in the cap 30a, only one access slot 35a and locking slot 33a of which is shown in FIG. 11. In the manner previously described, the cap 30a may be telescoped over the end of the body member 12a, and manually rotated, with the aid of diametrically opposed ears 39a, 40a integrally formed on the cap, such that the cap 30a is cammed inwardly toward the body member and ultimately turned to its locked position, which as previously described, can be felt, heard, and observed by the installer. The pipe coupling assembly 10a is particularly useful for coupling pipe sections which are flexible in nature since the end of the pipe section 15a is fixed to and rotates with the cap member 30a during insulation. When a rigid pipe section is utilized with such cap member, typically the entire pipe section would be rotated with the cap, and such pipe sections usually would be successively coupled together in end to end relation, and then disassembled in a reverse order. In either case, it will be understood that the cap member may be manually positioned and locked onto the body member by hand without tools of any kind, and may be disassembled by simply rotating in a reverse direction.

For enhancing the locking action and providing a reliable seal between the body member 12a and cap member 30a, a resilient annual gasket 50a is provided. The resilient annular gasket 50a surrounds the entrance to the axial passageway through the cap member, and the body and cap members 12a, 30a form (1) annular space on one side of the outer peripherial portion of the gasket, and (2) an annular bead pressing against the opposite side of that portion to effect a liquid tight seal on both sides of the gasket. In this embodiment, the cap member 30a is formed with an annular ledge 70 that defines the end of the passageway 65 therein and which further defines an annual space 52a outwardly therefrom. The gasket 50a is disposed adjacent the end of the annular ledge 70 and extends radially outwardly over the annular space 52a. On the opposite side of the gasket 50a from the annular space 52a, an annular bead 54a is formed as an integral part of the end of the body member 12a and engages the outer peripheral portion of the gasket 50a and bends it in an axial direction over the annular ledge 70. Such bending of the gasket 54a creates a concentrated sealing pressure in the relatively small area engaged by the tip of the bead 54a, and also around the periphery of the annular ledge 70. Hence, the coupling 10a enables quick and easy assembly and disassembly of mating pipe sections 11a, 15a, while at the same time insuring an excellent seal to prevent leakage through the joining parts.

Referring now to FIG. 12, there is shown an alternative embodiment of pipe coupling assembly 10b wherein parts similar to those previously described have been given similar reference numerals with the distinguishing suffix "b" added. The pipe coupling assembly 10b includes a cap member 30b which carries in coaxial relation the end of a first fluid transfer member or pipe section 15b and which is removably mountable on the end of a second fluid transfer member or pipe section 11b. The second fluid pipe section 11b, which is substantially similar to the second pipe section 11a previously described, includes a body member 12b having an externally threaded end 61b to which a conduit 62b is fixed. The lowermost end of the body member 12b is enlarged to receive a strainer 25b which has a radial flange 26b seating in a complimentary groove 27b formed in the body member 12b. The body member 12b of the second pipe section 11b and the cap member 30b have cooperating locking lugs and slots, also similar to those described for the nozzle assembly 10 and piping coupling assembly 10a, for permitting locking of the cap member 30b in assembled position on the body member 12b by simple rotary movement.

In keeping with a further aspect of the invention, the cap member 30b in this instance is disposed on the end of the first pipe section 15b for relative rotational and longitudinal movement so as to permit assembly and disassembly of the pipe sections 11b, 15b without rotation of such pipe sections. To this end, the first pipe section 15b includes a fitting 76 with a conduit 78 fixed thereto, the cap member 30b is formed with an axial opening 75 and is mounted for relative rotational and longitudinal movement on a fitting 76. The fitting 76 has a cylindrical section 79 over which the cap member 30b is slidably positionable and terminates in an outwardly flanged end 51b which seats on a internally formed radial flange surface of the cap member 30b when the cap member is in fully locked position, as shown in FIG. 12.

The pipe coupling assembly 10b includes an annular gasket 50b interposed between the annular beaded end 26b of the body member 12b of the second pipe section 11b and the flange 80 of the fitting 76 of the first pipe section 15b. The gasket 50b extends radially outwardly beyond the outer periphery of the flange 80 over an annular space 52b formed in the cap member 30b in outwardly spaced relation to the peripheral edge of the flange 80. The diameter of the annular bead 26b is greater than the diameter of the outer periphery of the flange 80 such that upon positioning of the cap member 30b onto the body member 12b of the second pipe section 11b, and rotation of the cap member in the locking direction, the cap member 30b is drawn onto the body member 12b and the gasket 50b is bent around the corner of the flange 80 concentrating sealing pressures between the annular bead 26b and flange the periphery of the flange 80. Hence, as in the case of the pipe coupling assembly 10a, the mating pipe sections can be quickly and easily assembled, while assuring reliable sealing between the joined ends thereof.

We claim as our invention:

1. A fluid transfer system comprising the combination of
   a cap member having a first fluid transfer member supported therein, a second fluid transfer member having an end positionable in axially spaced fluid communication with an end of said first fluid transfer member, said cap member and second fluid transfer member having cooperating lugs and slots for locking said cap and second members together when the cap member is placed on said second member and rotated relative thereto, resilient annular gasket disposed between said second member and cap member and surrounding the ends of said first and second members, and said cap and second members forming (1) an annular space on one side of an outer peripheral edge portion of said gasket, and (2) an annular sealing end pressing against the other side of said outer peripheral edge portion of said gasket so that said sealing end bends said outer peripheral edge portion of said gasket into said annular space to effect a liquid-tight seal on both sides of said gasket.

2. The fluid transfer system as set forth in claim 1 wherin the portion of said annular sealing end that engages said gasket is smoothly rounded in the radial direction.

3. The fluid transfer system as set forth in claim 1 wherein said cap member telescopes over the end of said second fluid transfer member, said locking lugs are formed on said second member, and said locking slots are formed in said cap member and extend radially through the wall of said cap member so that said lugs are visible through said slots.

4. The fluid transfer system as set forth in claim 1 in which said annular sealing end is formed on the end of said second member, and said annular space is formed by said cap member.

5. The fluid transfer system as set forth in claim 1 in which said first fluid transfer member is a spray tip seated in said cap member, said gasket is located on the inner end of said spray tip and extends radially outwardly beyond the periphery of said spray tip, said annular sealing end is formed on the end of said second member, and said annular space is formed by said cap member.

6. The fluid transfer system as set forth in claim 1 in which said first and second fluid transfer members are respective first and second pipe sections.

7. The fluid transfer system as set forth in claim 6 in which said first pipe section is a flexible conduit having an end fixed to said cap member.

8. The fluid transfer system as set forth in claim 6 in which said said cap member is mounted on the end of said first pipe section for relative rotational longitudinal movement.

9. The fluid transfer system as set forth in claim 8 in which said first pipe section has a flanged end seated in said cap, said gasket is located adjacent said flanged end and extends radially outwardly beyond the periphery of said flange end, said annular sealing end is formed on the end of said second pipe section, and said annular space is formed by said cap member.

10. The fluid transfer system as set forth in claim 1 in which said annular sealing end is formed on the end of said second fluid transfer member, said cap member has an integrally formed upstanding annular ledge about an axial passageway in fluid communication with said first and second fluid transfer members, said annular space is formed by said cap member radially outwardly of said annular ledge, said gasket is disposed between said annular ledge and said annular sealing end, and said annular sealing end has a larger diameter than said annular ledge.

11. A fluid transfer system comprising the combination of a cap member having a first fluid transfer member disposed therein, said first fluid transfer member having an end seated in said cap member with the immediately adjacent portion of said cap member defining an annular axially recessed space below said first fluid transfer member end, a second fluid transfer member adapted for coaxial mounting with respect to said cap member and first fluid transfer member, said cap member and second fluid transfer member having cooperating lugs and slots for locking said members to each other when they are fitted together and rotated relative to each other, a resilient gasket disposed between the ends of said first and second fluid transfer members, said gasket having a peripheral edge portion extending radially outwardly beyond the outer periphery of said ends, and an annular sealing portion formed on the end of said second fluid transfer member for engaging the peripheral edge portion of said gasket that is beyond the outer periphery of said first fluid transfer member and bending the engaged peripheral edge portion of said gasket in an axial direction about the outer periphery of said first fluid transfer member end into said recessed space to effect a reliable liquid seal between said annular selaing portion of said second fluid transfer member and said peripheral edge portion of said gasket and between the outer periphery of said first fluid transfer member and the peripheral edge portion of said gasket.

12. The fluid transfer system as set forth in claim 11 wherein said resilient annular gasket is in the form of a flat washer.

13. The fluid transfer system as set forth in claim 11 wherein the annular sealing portion that engages said gasket is smoothly rounded in the radial direction.

14. The fluid transfer system as set forth in claim 11 wherein said recessed annular space defined by said cap extends from the periphery of the inner end of said first fluid transfer member to the outer periphery of said gasket, so that the entire outer peripheral edge portion of said gasket, beyond the periphery of said first fluid transfer member end, can be bent axially into said space by said sealing portion.

15. A fluid transfer system comprising the combination of a cap member having a first fluid transfer member, a second fluid transfer member adapted for fluid communication with said first fluid transfer member, said cap member and second fluid transfer member having cooperating lugs and slots for releasably locking said members together when the cap memberis placed on said second member and rotated relative thereto, said locking slots being formed by said cap member and extending radially through the wall of said cap member so that said lugs are visible through said slots, portions of at least one wall of each of said slots forming locking surfaces which cooperate with said lugs to lock said cap member to said lugs in response to rotational displacement of said slots over said lugs, and said cap member further being formed with axial access grooves for admitting said lugs into said slots, the axial length of said grooves being shorter than the axial length 16. A fluid transfer system comprising the combination of a cap member having a first fluid transfer member, a second fluid transfer member adapted for fluid communication with said first fluid transfer member, said cap member and second fluid transfer member having cooperating lugs and slots for locking said cap member and second member together when the cap is placed on said second member and rotated relative thereto, said slots forming cam surfaces which cam said cap member tightly onto second member as said cap and second members are rotated relative to each other, said slots also forming notches adjacent the ends of said cam surfaces for engaging said lugs and holding said cap member in a predetermined lock position relative to said lugs, the ends of said notches adjacent said cam surfaces being tapered in the direction of said cam surfaces so that the application of a turning torque to said cap member is sufficient to disengage said locking notches from said lugs so that said cap member can be removed from said second member, and said engaging surfaces of said lugs and the ends of said notches lying on radii of said cap member so that said lugs are engaged along their entire radial width.

17. A spray nozzle assembly comprising the combination of a cap member having a spray tip therein with a liquid passageway for conducting liquid into said spray tip, and a body member for supplying liquid to said passageway and spray tip, said cap and body member having cooperating lugs and slots for locking said members together when the cap is placed on said body member and rotated relative thereto, a resilient annular gasket disposed between said body and cap members and surrounding the liquid passageway leading into said spray tip to prevent liquid from leaking out of said passageway, and said cap and second members forming (1) an annular space on one side of an outer peripheral edge portion of said gasket, and (2) an annular sealing end pressing against the other side of said outer peripheral edge portion of said gasket so that said sealing end bends said outer peripheral edge portion of said gasket into said annular space to effect a liquid-tight seal on both sides of said gasket.

18. A spray nozzle assembly as set forth in claim 17 wherein said spray tip is seated in said cap member, said gasket is located on the inner end of said spray tip and the peripheral portion thereof extends radially outwardly beyond the periphery of said spray tip, said annular sealing end being formed on the end of said body member, and said annular space is formed by said cap member.

19. A spray nozzle assembly as set forth in claim 17 wherein said annular sealing end that engages said gasket is smoothly rounded in the radial direction.

20. A spray nozzle assembly as set forth in claim 17 wherein said cap member telescopes over the end of said body member, said locking lugs are formed by said body member, and said locking slots are formed by said cap member and extend radially through the wall of said cap member so that said lugs are visible through said slots.

21. A spray nozzle assembly comprising the combination of coaxial body and cap members having cooperating lugs and slots for locking said members to each other when they are fitted together and rotated relative to each other, a spray tip seated in said cap member with the immediately adjacent portion of said cap defining an annular axially recessed space below the inner end of said spray tip, and a resilient gasket disposed between the ends of said first and second fluid transfer members, said gasket having a peripheral edge portion extending radially outwardly beyond the outer periphery of the inner end of said spray tip, and an annular sealing portion formed on the end of said second fluid transfer member for engaging the peripheral edge portion of said gasket that is beyond the outer periphery of said spray tip and bending the engaged peripheral edge portion of said gasket in an axial direction along the side walls of said spray tip.

22. A spray nozzle assembly as set forth in claim 21 wherein said resilient annular gasket is in the form of a flat washer.

23. A spray nozzle assembly as set forth in claim 21 wherein the portion of said annular sealing portion that engages said gasket is smoothly rounded in the radial direction.

24. A spray nozzle assembly as set forth in claim 21 wherein said recessed space defined by said cap extends from the periphery of the inner end of said spray tip to the outer periphery of said gasket, so that the entire peripheral edge portion of said gasket, beyond the periphery of the spray tip, can be bent axially into said space by said annular sealing portion.

25. A spray nozzle assembly comprising the combination of a cap member having a spray tip therein, and a body member for supplying liquid to said spray tip, said cap and body member having cooperating lugs and slots for locking said members together when the cap is placed on said body member and rotated relative thereto, said locking slots being formed by said cap member and extending radially through the wall of said cap member so that said lugs are visible through said slots, portions of at least one wall of each of said slots forming locking surfaces which cooperate with said lugs to lock said cap member to said lugs in response to rotational displacement of said slots over said lugs, and said cap member further being formed with axial access grooves for admitting said lugs into said slots, the axial length of said grooves being shorter than the axial length of said lugs so that said lugs are always visible beyond at least one end of said access grooves.

26. The spray noxxle assembly as set forth in claim 25 wherein the end walls of each of said slots taper inwardly toward each other to facilitate the molding thereof.

27. A spray nozzle assembly comprising the combination of a cap member having a spray tip adapted for imparting a determined form of spray pattern to pressurized liquid passing through said spray tip, a body member for supplying liquid to said spray tip, an annular resilient sealing member interposed between said cap and body members, said cap and body members having cooperating lugs and slots for locking said members together when the cap is placed on said body member and rotated relative thereto, said slots being formed in said cap member and extending radially through the wall of said cap member so that said lugs are visible through said slots, said slots defining cam surfaces which cam said cap member tightly onto said body member as said cap and body members are rotated relative to each other with said interposed sealing member biasing said cap member and body member in opposed relation while creating a liquid tight seal therebetween, and said slots further defining notches adjacent the ends of said cam surfaces for engaging said lugs and holding said cap member in a predetermined locked position relative to said lugs with the spray tip in predetermined orientation with respect to said body member.

28. A spray nozzle assembly as set forth in claim 27 wherein the engaging surfaces of said lugs and the ends of said notches lie on radii of said cap member so that said lugs are engaged along their entire radial width.

29. The spray nozzle assembly of claim 27 in which said spray tip is removably positionable in said cap member, said cap member being formed with an aperture that allows said spray tip to extend through one end thereof, and said cap member has a plurality of integrally formed spring fingers on at least one of the walls of said aperture for engaging the adjacent side of said spray tip and applying a biasing force to said spray tip to hold it snugly in said cap member.

30. The spray nozzle assembly of claim 27 in which said spray tip is a separate removable and replacable member seated in said cap member, and said resilient sealing means is interposed between said spray tip member and said body member.

31. The spray nozzle assembly of claim 27 in which the ends of said notches adjacent said cam surfaces are tapered in the direction of said cam surfaces so that the application of a turning torque to said cap member is sufficient to disengage the locking notches form said lugs to facilitate removal of said cap member from said body member.

* * * * *